United States Patent
Zhang et al.

(10) Patent No.: US 9,858,192 B2
(45) Date of Patent: Jan. 2, 2018

(54) CROSS-PAGE PREFETCHING METHOD, APPARATUS, AND SYSTEM

(71) Applicant: Huawei Technologies Co., Ltd., Shenzhen, Guangdong (CN)

(72) Inventors: Lixin Zhang, Beijing (CN); Liuhang Zhang, Beijing (CN); Rui Hou, Beijing (CN); Ke Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 14/928,635

(22) Filed: Oct. 30, 2015

(65) Prior Publication Data
US 2016/0055088 A1    Feb. 25, 2016

Related U.S. Application Data

(63) Continuation of application No. PCT/CN2014/075588, filed on Apr. 17, 2014.

(30) Foreign Application Priority Data

May 2, 2013  (CN) .......................... 2013 1 0159064

(51) Int. Cl.
*G06F 12/00* (2006.01)
*G06F 12/0862* (2016.01)

(52) U.S. Cl.
CPC .. *G06F 12/0862* (2013.01); *G06F 2212/1016* (2013.01); *G06F 2212/1021* (2013.01); *G06F 2212/602* (2013.01); *G06F 2212/608* (2013.01); *G06F 2212/6026* (2013.01)

(58) Field of Classification Search
CPC ......... G06F 12/0862; G06F 2212/1016; G06F 2212/608; G06F 2212/1021; G06F 2212/602; G06F 2212/6026
See application file for complete search history.

(56) References Cited

U.S. PATENT DOCUMENTS

| | | |
|---|---|---|
| 2006/0179236 A1 | 8/2006 | Shafi |
| 2006/0248281 A1 | 11/2006 | Al-Sukhni et al. |
| 2008/0034187 A1 | 2/2008 | Stempel et al. |

(Continued)

FOREIGN PATENT DOCUMENTS

| | | |
|---|---|---|
| CN | 101300555 A | 11/2008 |
| CN | 101495962 A | 7/2009 |

(Continued)

*Primary Examiner* — Reginald Bragdon
*Assistant Examiner* — Hannah A Faye-Joyner

(57) ABSTRACT

A cross-page prefetching method, apparatus, and system are disclosed, which can improve a prefetching hit ratio of a prefetching device, and further improve efficiency of memory access. The method includes: receiving an indication message, sent by a cache, that a physical address is missing, where the indication message carries a mapped-to first physical address and contiguity information of a first physical page to which the first physical address belongs; acquiring a prefetching address according to the first physical address and a step size that is stored in a prefetching device; and if a page number of a physical page to which the prefetching address belongs is different from a page number of the first physical page, and it is determined, according to the contiguity information of the first physical page, that the first physical page is contiguous, prefetching data at the prefetching address.

8 Claims, 12 Drawing Sheets

(56) References Cited

U.S. PATENT DOCUMENTS

| | | |
|---|---|---|
| 2008/0294867 A1 | 11/2008 | Kimura |
| 2009/0198909 A1 | 8/2009 | Speight et al. |
| 2012/0054449 A1 | 3/2012 | Hu et al. |
| 2014/0181459 A1 | 6/2014 | Venkumahanti et al. |

FOREIGN PATENT DOCUMENTS

| | | |
|---|---|---|
| CN | 102169429 A | 8/2011 |
| CN | 102737037 A | 10/2012 |
| JP | 2001-084216 A | 3/2001 |
| JP | 2013-539117 A | 10/2013 |
| JP | 2016-505972 A | 2/2016 |
| KR | 20090042292 A | 4/2009 |
| KR | 20120018307 A | 3/2012 |
| WO | 2008016849 A2 | 2/2008 |
| WO | 2010/129154 A2 | 11/2010 |

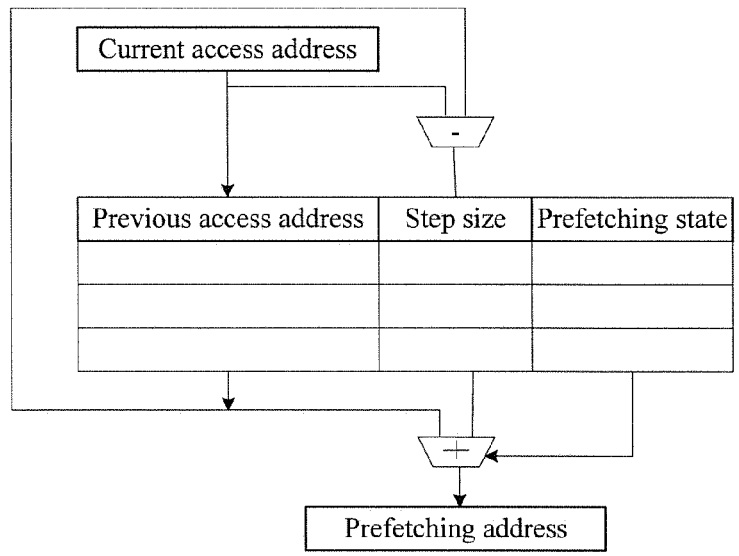

FIG. 1

| Receive an indication message, sent by a cache, that a physical address is missing, where the indication message carries a mapped-to first physical address and contiguity information of a first physical page to which the first physical address belongs | 201 |

| Acquire a prefetching address according to the first physical address and a step size that is stored in a prefetching device | 202 |

| If a page number of a physical page to which the prefetching address belongs is different from a page number of the first physical page, and it is determined, according to the contiguity information of the first physical page, that the first physical page is contiguous, prefetch data at the prefetching address | 203 |

FIG. 2

CROSS-PAGE PREFETCHING METHOD, APPARATUS, AND SYSTEM

CROSS-REFERENCE TO RELATED APPLICATIONS

This application is a continuation of International Application No. PCT/CN2014/075588, filed on Apr. 17, 2014, which claims priority to Chinese Patent Application No. 201310159064.1, filed on May 2, 2013, both of which are hereby incorporated by reference in their entireties.

TECHNICAL FIELD

The present invention relates to the computer field, and in particular, to a cross-page prefetching method, apparatus, and system.

BACKGROUND

Development of times gradually increases performance differences between a CPU (Central Processing Unit, central processing unit) and a memory. Various technologies are developed to reduce a delay of memory access, for example, use of a pipeline or multithreading. Data prefetching is also one of such technologies.

Data prefetching is a method of fetching in advance, from a memory before a processor accesses the memory, data A that is subsequently required and storing the data A into a Cache (cache). Then, when a CPU accesses A, the access can be directly performed because A already exists in the Cache, which reduces a delay caused by searching for A when the CPU accesses the memory.

Addresses used in instruction or data invoking by an application program during an execution process are all virtual addresses. In order to access a corresponding instruction or data from the memory, the virtual addresses need to be mapped to corresponding physical addresses. However, in a process of executing translation between a virtual address and a physical address, contiguous virtual pages may be mapped to contiguous physical pages, or may be mapped to noncontiguous physical pages.

When determining that cross-page prefetching needs to be performed, an existing prefetching device stops prefetching, which may prevent invalid cross-page prefetching when contiguous virtual pages are mapped to noncontiguous physical pages. However, 50% to 70% physical pages mapped to virtual pages are actually contiguous, that is, a determined prefetching address is valid. Based on a method in the prior art, when an invalid cross-page prefetching is prevented, a valid cross-page prefetching may also be prevented, which causes a low prefetching hit ratio of a prefetching device, and further reduces efficiency of memory access.

SUMMARY

Embodiments of the present invention provide a cross-page prefetching method, apparatus, and system, which can improve a prefetching hit ratio of a prefetching device, and further improve efficiency of memory access.

To achieve the foregoing objective, the following technical solutions are adopted in the embodiments of the present invention:

According to a first aspect, a cross-page prefetching method is provided, where the method includes:

receiving an indication message, sent by a cache, that a physical address is missing, where the indication message carries a mapped-to first physical address and contiguity information of a first physical page to which the first physical address belongs, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address;

acquiring a prefetching address according to the first physical address and a step size that is stored in a prefetching device; and if a page number of a physical page to which the prefetching address belongs is different from a page number of the first physical page, and it is determined, according to the contiguity information of the first physical page, that the first physical page is contiguous, prefetching data at the prefetching address.

According to the first aspect, in a first possible implementation manner, after the receiving an indication message, sent by a cache, that a physical address is missing, the method further includes:

storing, into an entry that is corresponding to the first physical address and is in a prefetching information table, the contiguity information that is of the first physical page to which the first physical address belongs and is carried in the indication message, where the prefetching information table is stored in the prefetching device.

According to the first aspect, in a second possible implementation manner, before the acquiring a prefetching address according to the first physical address and a step size that is stored in a prefetching device, the method further includes:

acquiring first index information of the first physical address according to a compression algorithm and the first physical address;

if a page number of a physical page, included in an entry that is corresponding to the first index information and is in a prefetching information table, matches the page number of the first physical page, determining whether training of a prefetching mechanism of the prefetching device is completed, where the prefetching information table is stored in the prefetching device;

if the training of the prefetching mechanism is completed, executing the step of acquiring a prefetching address; and if the page number of the physical page, included in the entry that is corresponding to the first index information and is in the prefetching information table, does not match the page number of the first physical page, storing the page number of the first physical page and the contiguity information of the first physical page into the entry that is corresponding to the first index information and is in the prefetching information table.

According to the second possible implementation manner, in a third possible implementation manner, the first index information of the first physical address specifically includes at least one of the following information:

the page number of the first physical page to which the first physical address belongs;

a compression value of the page number of the first physical page to which the first physical address belongs; and a hash value of the page number of the first physical page to which the first physical address belongs.

According to a second aspect, a cross-page prefetching method is provided, where the method includes:

receiving a first indication message of applying for memory space, where the first indication message carries capacity information of the memory space;

allocating physical memory space and virtual memory space according to the capacity information of the memory space;

establishing a mapping relationship between the virtual memory space and the physical memory space, where the mapping relationship includes a page number of a first physical page and contiguity information of the first physical page, where the first physical page is a page to which a mapped-to first physical address corresponding to a first virtual address included in the virtual memory space belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address; and sending the mapping relationship to a memory, so that the memory stores the mapping relationship.

According to a third aspect, a cross-page prefetching method is provided, where the method includes:

sending a second indication message to a memory, where the second indication message carries a first virtual address, so that the memory sends, according to the first virtual address, a mapping relationship corresponding to the first virtual address to the translation lookaside buffer TLB, where the mapping relationship includes a page number of a first physical page and contiguity information of the first physical page, where the first physical page is a page to which a mapped-to first physical address corresponding to the first virtual address belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address;

receiving the mapping relationship sent by the memory;

acquiring, according to the mapping relationship, the first physical address corresponding to the first virtual address; and sending, to a cache, the first physical address and the contiguity information of the first physical page to which the first physical address belongs.

According to a fourth aspect, a cross-page prefetching method is provided, where the method includes:

receiving, from a translation lookaside buffer TLB, a first physical address and contiguity information of a first physical page to which the first physical address belongs, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address;

if a cache does not store data of the first physical address, sending the first physical address to a memory, so that a processor acquires the data of the first physical address from the memory; and sending an indication message that a physical address is missing to a prefetching device, where the indication message carries the first physical address and the contiguity information of the first physical page to which the first physical address belongs.

According to a fifth aspect, a prefetching device is provided, where the prefetching device includes a receiving unit, an acquiring unit, and a prefetching unit, where the receiving unit is configured to receive an indication message, sent by a cache, that a physical address is missing, where the indication message carries a mapped-to first physical address and contiguity information of a first physical page to which the first physical address belongs, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address;

the acquiring unit is configured to acquire a prefetching address according to the first physical address and a step size that is stored in the prefetching device; and the prefetching unit is configured to: if a page number of a physical page to which the prefetching address belongs is different from a page number of the first physical page, and it is determined, according to the contiguity information of the first physical page, that the first physical page is contiguous, prefetch data at the prefetching address.

According to the fifth aspect, in a first possible implementation manner, the prefetching device further includes a storage unit; and the storage unit is configured to: after the receiving unit receives the indication message, sent by the cache, that a physical address is missing, store, into an entry that is corresponding to the first physical address and is in a prefetching information table, the contiguity information that is of the first physical page to which the first physical address belongs and is carried in the indication message, where the prefetching information table is stored in the prefetching device.

According to the fifth aspect, in a second possible implementation manner, the prefetching device further includes a determining unit, an execution unit, and a storage unit, where the acquiring unit is configured to: before the acquiring a prefetching address according to the first physical address and a step size that is stored in a prefetching device, acquire first index information of the first physical address according to a compression algorithm and the first physical address;

the determining unit is configured to: if a page number of a physical page, included in an entry that is corresponding to the first index information and is in a prefetching information table, matches the page number of the first physical page, determine whether training of a prefetching mechanism of the prefetching device is completed, where the prefetching information table is stored in the prefetching device;

the execution unit is configured to: if the training of the prefetching mechanism is completed, execute the step of acquiring a prefetching address; and the storage unit is configured to: if the page number of the physical page, included in the entry that is corresponding to the first index information and is in the prefetching information table, does not match the page number of the first physical page, store the page number of the first physical page and the contiguity information of the first physical page into the entry that is corresponding to the first index information and is in the prefetching information table.

In a third possible implementation manner, the first index information of the first physical address specifically includes at least one of the following information:

the page number of the first physical page to which the first physical address belongs;

a compression value of the page number of the first physical page to which the first physical address belongs; and a hash value of the page number of the first physical page to which the first physical address belongs.

According to a sixth aspect, a processor is provided, where the processor includes a receiving unit, an allocating unit, an establishing unit, and a sending unit, where the receiving unit is configured to receive a first indication message of applying for memory space, where the first indication message carries capacity information of the memory space;

the allocating unit is configured to allocate physical memory space and virtual memory space according to the capacity information of the memory space;

the establishing unit is configured to establish a mapping relationship between the virtual memory space and the physical memory space, where the mapping relationship includes a page number of a first physical page and contiguity information of the first physical page, where the first physical page is a page to which a mapped-to first physical address corresponding to a first virtual address included in the virtual memory space belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address; and the sending unit is configured to send the mapping relationship to a memory, so that the memory stores the mapping relationship.

According to a seventh aspect, a translation lookaside buffer TLB is provided, where the TLB includes a first sending unit, a receiving unit, an acquiring unit, and a second sending unit, where the first sending unit is configured to send a second indication message to a memory, where the second indication message carries a first virtual address, so that the memory sends, according to the first virtual address, a mapping relationship corresponding to the first virtual address to the translation lookaside buffer TLB, where the mapping relationship includes a page number of a first physical page and contiguity information of the first physical page, where the first physical page is a page to which a mapped-to first physical address corresponding to the first virtual address belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address;

the receiving unit is configured to receive the mapping relationship sent by the memory;

the acquiring unit is configured to acquire, according to the mapping relationship, the first physical address corresponding to the first virtual address; and the second sending unit is configured to send, to a cache, the first physical address and the contiguity information of the first physical page to which the first physical address belongs.

According to an eighth aspect, a cache is provided, where the cache includes a receiving unit, a first sending unit, and a second sending unit, where the receiving unit is configured to receive a first physical address and contiguity information of a first physical page to which the first physical address belongs that are sent by a translation lookaside buffer TLB, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address;

the first sending unit is configured to: if the cache does not store data of the first physical address, send the first physical address to a memory, so that a processor acquires the data of the first physical address from the memory; and the second sending unit is configured to send an indication message that a physical address is missing to a prefetching device, where the indication message carries the first physical address and the contiguity information of the first physical page to which the first physical address belongs.

According to a ninth aspect, a cross-page prefetching system is provided, where the cross-page prefetching system includes a memory, the prefetching device according to the fifth aspect, the processor according to the sixth aspect, the translation lookaside buffer TLB according to seventh aspect, and the cache according to the eighth aspect.

Embodiments of the present invention provide a cross-page prefetching method, apparatus, and system. The method includes: receiving, by a processor, a first indication message of applying for memory space; allocating, by the processor, physical memory space and virtual memory space according to capacity information of the memory space carried in the first indication message; establishing, by the processor, a mapping relationship between the virtual memory space and the physical memory space, where the mapping relationship includes a page number of a first physical page and contiguity information of the first physical page, where the first physical page is a page to which a mapped-to first physical address corresponding to a first virtual address included in the virtual memory space belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address; and finally, sending, by the processor, the mapping relationship to a memory. In this way, when a translation lookaside buffer TLB sends, to the memory, a second indication message that a mapping relationship corresponding to the first virtual address is missing, the memory may send the mapping relationship that includes the contiguity information of the first physical page and is corresponding to the first virtual address to the TLB, so that the TLB receives the mapping relationship that includes the contiguity information of the first physical page, and after the translation between the first virtual address and the first physical address is completed, the TLB sends, to a cache, the first physical address and the contiguity information of the first physical page to which the first physical address belongs. In this way, when a physical address is missing in the cache, the contiguity information may enter a prefetching device along with data flows, so that after training of a prefetching mechanism is completed and the prefetching device acquires a prefetching address, if a page number of a physical page to which the prefetching address belongs is different from a page number of the first physical page, and it is determined, according to the contiguity information of the first physical page, that the first physical page is contiguous, the prefetching device prefetches data at the prefetching address. Therefore, the present invention solves a problem in the prior art of a low hit ratio of the prefetching device because prefetching is stopped after it is determined that cross-page prefetching needs to be performed, improves a prefetching hit ratio of the prefetching device and further improves efficiency of memory access.

BRIEF DESCRIPTION OF THE DRAWINGS

To describe the technical solutions in the embodiments of the present invention more clearly, the following briefly introduces the accompanying drawings required for describing the embodiments.

FIG. 1 is a schematic diagram of a prefetching structure in a prefetching device;

FIG. 2 is a schematic diagram of a cross-page prefetching method according to an embodiment of the present invention;

DETAILED DESCRIPTION

Figure 3:
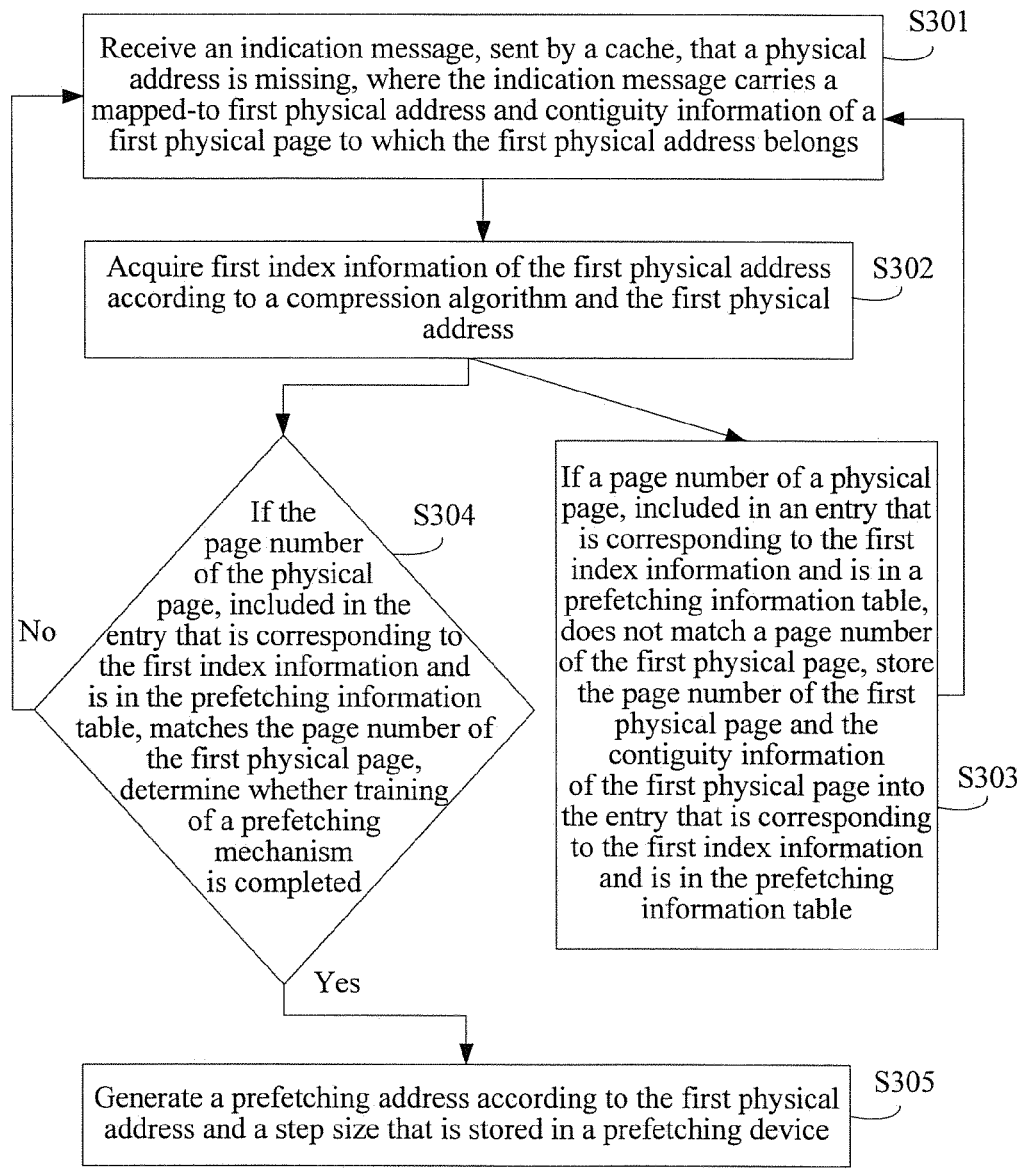
FIG. 3 is a schematic diagram of a method for training a prefetching mechanism according to an embodiment of the present invention.

The following clearly and describes the technical solutions in the embodiments of the present invention with reference to the accompanying drawings in the embodiments of the present invention.

In order to improve a speed of executing an instruction or acquiring data by a processor, a prefetching technology is generally used in the prior art to prefetch from a memory, an instruction to be executed by the processor or data to be acquired by the processor, and store the instruction or the data into a cache. The prefetching technology may be classified into software prefetching and hardware prefetching.

When data prefetching is performed by using software, a prefetching instruction needs to be explicitly added to program code and data to be subsequently used needs to be explicitly prefetched.

When prefetching is performed by using hardware, prefetching is implemented by dedicated hardware. The hardware obtains, by training, a set of "prefetching mechanism" according to a status of a current fetch address and a status of a previous fetch address. Then the prefetching device obtains, by calculation, a prefetching address by using the "prefetching mechanism" and with reference to the current fetch address, thereby prefetching in advance, from a memory, data at the prefetching address and storing the data at the prefetching address into a cache. The process is transparent to a programmer or a compiler. FIG. 1 is a frequently used prefetching structure.

It can be seen from FIG. 1, the prefetching structure includes three addresses that separately are a current fetch address, a previous fetch address, and a prefetching address. In addition, the prefetching structure further stores a step size and information about a prefetching state of a prefetching device. When the prefetching address is being acquired, the current fetch address and the previous fetch address are first compared to obtain a step size. The calculated step size and a step size previously stored in a step size unit are compared. If the calculated step size is consistent with the step size previously stored in the step size unit, the prefetching address is obtained by calculation according to a relationship in which a prefetching address=a current fetch address+a step size; if the calculated step size is inconsistent with the step size previously stored in the step size unit, the step size and the state are appropriately updated.

It should be noted that, prefetching is classified into prefetching based on a physical address and prefetching based on a virtual address. If a prefetching device performs prefetching based on a virtual address, cross-page prefetching is valid due to continuity of the virtual address. However, in the prefetching based on a virtual address, a TLB (Translation lookaside buffer, translation lookaside buffer) needs to be searched for to perform virtual-physical translation, which needs to bear a cost of performance. In addition, some prefetching devices cannot access the TLB. Therefore, the prefetching involved in the specification are hardware prefetching based on a physical address, and the prefetching based on a virtual address is not described in this specification.

Embodiment 1

An embodiment of the present invention provides a cross-page prefetching method. As specifically shown in FIG. 2, the method includes:

201. Receive an indication message, sent by a cache, that a physical address is missing, where the indication message carries a mapped-to first physical address and contiguity information of a first physical page to which the first physical address belongs, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address.

It should be noted that, generally, when a processor does not hit an instruction or data from a cache, in order to improve a speed of reading an instruction or data, the cache generally acquires a corresponding instruction or data from a memory according to a storage address of the instruction or data accessed by the processor, sends an indication message that a physical address is missing to a prefetching device, instructs the prefetching device to prefetch, from the memory, a next instruction or next data to be accessed by the processor, and stores the next instruction or the next data to be accessed by the processor into the cache.

The prefetching device may store, into an entry that is corresponding to the first physical address and is in a prefetching information table, the contiguity information that is of the first physical page to which the first physical address belongs and is carried in the indication message, where the prefetching information table is stored in the prefetching device.

Certainly, in order to reduce a quantity of entries, the first physical address may be stored, in an index manner, in the prefetching information table of the prefetching device. After receiving the indication message that a physical address is missing, the prefetching device first acquires, according to an index manner of a physical address stored in the prefetching information table of the prefetching device and an index algorithm, first index information corresponding to the first physical address, then searches for the first index information included in the prefetching information table stored in the prefetching device, and further acquires a related entry of the first physical address. The first index information may specifically include at least one piece of the following information:

the page number of the first physical page to which the first physical address belongs, a compression value of the page number of the first physical page to which the first physical address belongs, and a hash value of the page number of the first physical page to which the first physical address belongs.

For example A, the first index information is the compression value of the page number of the first physical page to which the first physical address belongs:

It is assumed that a fetch address has 32 bits and a size of one page is 4 kb, that is, high 20 bits of the fetch address is a page number and low 12 bits of the fetch address is a page offset. For example, a first physical address (represented in binary) is:

1010,1010,1010,1010,1010,0011,0011,0011, the page number is 1010, 1010, 1010, 1010, 1010, and the page offset is 0011, 0011, 0011.

If the page number is used as the first index information, the quantity of entries of the index information stored in the prefetching device is 2^20.

Several bits of the page number may be fetched by using a compression algorithm and used as the index information. For example, if a quantity of entries of index information stored in the prefetching device is only 128, the first 7 bits of the page number is used as an index value by using the compression algorithm, that is, 1010101 is fetched and used as the index information.

For example B, the first index information is the hash value of the page number of the first physical page to which the first physical address belongs:

It is assumed that the hash value is calculated according to formula (1):

index=a page number of a physical page % 128    (formula 1)

where % represents an REM operation.

When a fetch address (represented in binary) is 1010, 1010, 1010, 1010, 1010, 0011, 0011, 0011, a page number is 1010, 1010, 1010, 1010, 1010 that equals 699050 after converted to decimal.

According to formula (1)

index=699050% 128=42, that is, the index information is 42 that equals 101010 when represented in binary.

This embodiment of the present invention merely exemplarily presents several representation methods of the first index information. Certainly, the first index information may further store another manner, which is not specifically limited in this embodiment of the present invention.

Specifically, if a page number of a physical page, included in an entry that is corresponding to the first index information and is in the prefetching information table, may not match a page number of the first physical page, the prefetching device stores, into the entry, the page number of the first physical page and the contiguity information of the first physical page, and performs training of a prefetching mechanism again.

For example, it is assumed that a first physical address carried in a currently received indication message that a physical address is missing is A+B (where A represents a physical page number and B represents a page offset), after first index information M is acquired according to an index algorithm, if it is found that a page number of a physical page, in an entry corresponding to M, does not match A, the page number that is of the physical page and is in the entry corresponding to M is updated to A, and simultaneously, contiguity information of the physical page is updated, a step size is configured as 0, a prefetching state is updated to an initialization state, A+B is written into a previous fetch address entry, and training of the prefetching mechanism is performed again.

However, if the page number of the physical page, in the entry that is corresponding to the first index information and is in the prefetching information table, matches the page number of the first physical page, but the training of the prefetching mechanism may not be completed, only the training of the prefetching mechanism needs to be continuously performed, which includes performing updating on information, such as a step size of the prefetching device, a prefetching state, and a previous fetch address, which is not listed one by one herein in the present invention.

For example, continuing with the foregoing example, it is assumed that a first physical address, carried in an indication message that a physical address is missing and is newly received by the prefetching device, is A+B+1 (where A is a physical page number and B+1 is a page offset), after the first index information M is acquired according to an index algorithm, if it is found that a physical page number in a first entry corresponding to M matches A, a step size of 1 is obtained by calculation, a prefetching state is updated to a ready state, a previous fetch address is updated to A+B+1, and the training of the prefetching mechanism is continuously performed.

202. Acquire a prefetching address according to the first physical address and a step size that is stored in a prefetching device.

Specifically, with reference to a description part of step 201, if the page number of the physical page, in the entry that is corresponding to the first index information and is in the prefetching information table, matches the page number of the first physical page, and the training of the prefetching mechanism is completed, the prefetching device may acquire the prefetching address according to the first physical address and the step size that is stored in the prefetching device.

A process of training a prefetching mechanism may be shown in FIG. 3, which includes:

S301. Receive an indication message, sent by a cache, that a physical address is missing, where the indication message carries a mapped-to first physical address and contiguity information of a first physical page to which the first physical address belongs, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address.

S302. Acquire first index information of the first physical address according to a compression algorithm and the first physical address.

S303. If a page number of a physical page, included in an entry that is corresponding to the first index information and is in a prefetching information table, does not match a page number of the first physical page, store the page number of the first physical page and the contiguity information of the first physical page into the entry that is corresponding to the first index information and is in the prefetching information table.

Specifically, the prefetching information table is stored in the prefetching device.

Because a prefetching mechanism of a prefetching device has begun training, step S301 is turned to, that is, a new indication message that a physical address is missing is received, and training of the prefetching mechanism is performed.

S304. If the page number of the physical page, included in the entry that is corresponding to the first index information and is in the prefetching information table, matches the page number of the first physical page, determine whether training of a prefetching mechanism of a prefetching device is completed.

S305. If the training of the prefetching mechanism is completed, acquire a prefetching address according to the first physical address and a step size that is stored in the prefetching device.

Certainly, if the training of the prefetching mechanism is not completed, step S301 is turned to, and an indication message that a physical address is missing is continuously received, so that the training of the prefetching mechanism is continuously performed until the training of the prefetching mechanism is completed.

It should be noted that, for the two cases, in which the training of the prefetching mechanism is not completed, involved in the description part of step 201, the prefetching device cannot generate a prefetching address, which is not within the discussion scope of this embodiment of the present invention.

It should be noted that, the foregoing method of generating the prefetching address according to the first physical address and the step size that is stored in the prefetching device is merely an exemplary description, another method for acquiring a prefetching address may exist in the prior art. It may be understood that a person skilled in the art should understand the another method for acquiring a prefetching address in the prior art, which is not described one by one in this embodiment of the present invention 203. If a page number of a physical page to which the prefetching address belongs is different from a page number of the first physical page, and it is determined, according to the contiguity information of the first physical page, that the first physical page is contiguous, prefetch data at the prefetching address.

Specifically, if the page number of the physical page to which the prefetching address belongs is different from the page number of the first physical page, which indicates that the prefetching address crosses pages, and after that the first physical page is contiguous is determined according to the contiguity information of the first physical page, the data at the prefetching address may be prefetched.

It should be noted that, the method is a cross-page prefetching method, therefore, only a case in which a prefetching address crosses pages is discussed, and a prefetching method in which a prefetching address does not cross a page is not discussed in this embodiment of the present invention.

In this embodiment of the present invention, when a prefetching address crosses pages, cross-page prefetching is further executed in a case in which a physical page of a current fetch address is contiguous, which solves a problem in the prior art of a low hit ratio of a prefetching device because prefetching is stopped after cross-page prefetching is determined, improves a prefetching hit ratio of the prefetching device and further improves efficiency of memory access.

Figure 4:
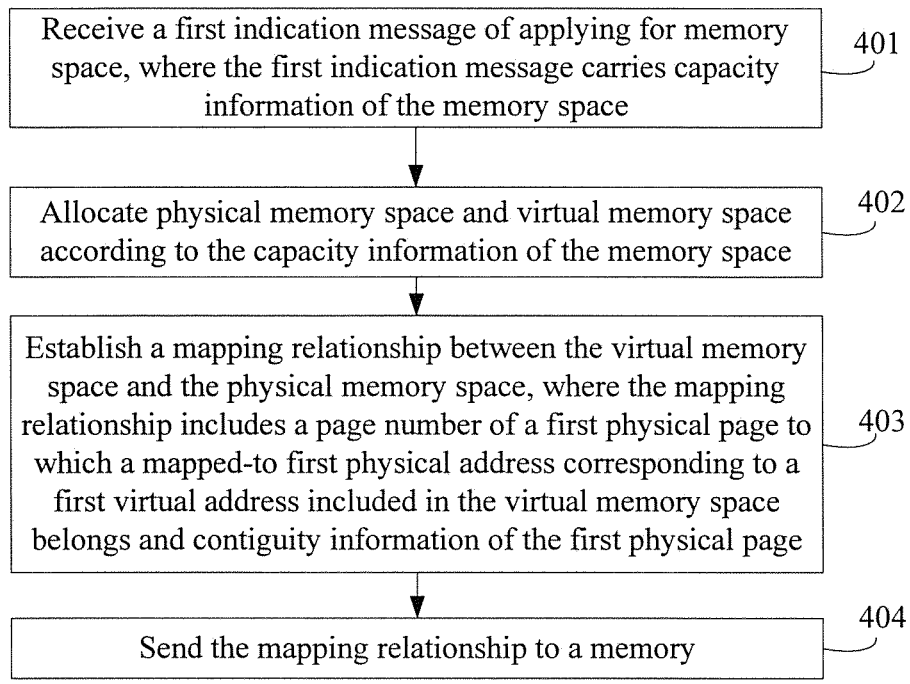
FIG. 4 is another schematic diagram of a cross-page prefetching method according to an embodiment of the present invention.

This embodiment of the present invention further provides a cross-page prefetching method. As specifically shown in FIG. 4, the method includes:

401. Receive a first indication message of applying for memory space, where the first indication message carries capacity information of the memory space.

402. Allocate physical memory space and virtual memory space according to the capacity information of the memory space.

Specifically, when an application program is loaded, a processor first receives the first indication message that the application program applies for the memory space, where the first indication message carries the capacity information of the memory space. Then the processor allocates corresponding physical memory space and virtual memory space according to the capacity information of the memory space. When the physical memory space and the virtual memory space are being allocated, if the first indication message carries information about a virtual address, a corresponding size of virtual memory space is opened up according to the virtual address; if the first indication message does not carry information about a virtual address, the processor randomly allocates appropriate virtual memory space, and correspondingly, the processor randomly allocates appropriate physical memory space.

It should be noted that, a problem of allocating memory space belongs to a problem in the prior art, which is not specifically limited in this embodiment of the present invention, and only an exemplary implementation solution is provided.

403. Establish a mapping relationship between the virtual memory space and the physical memory space, where the mapping relationship includes a page number of a first physical page and contiguity information of the first physical page, where the first physical page is a page to which a mapped-to first physical address corresponding to a first virtual address included in the virtual memory space belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address.

Specifically, the mapping relationship, established in the prior art, between the virtual memory space and the physical memory space includes only page number information of the first physical page to which the mapped-to first physical address corresponding to the first virtual address included in the virtual memory space belongs; in this embodiment of the present invention, the mapping relationship established by the processor further stores the contiguity information of the first physical page, where the contiguity information of the first physical page is used to indicate whether the physical page mapped to the first virtual page is contiguous with the physical page mapped to the next contiguous virtual page of the first virtual page, the first virtual page includes the first virtual address mapped to the first physical address, and the contiguity information and the page number of the first physical page coexist in the mapping relationship.

Specifically, the mapping relationship between the virtual memory space and the physical memory space may be represented by using a mapping relationship page table. The contiguity information of the first physical page may be determined by using one bit of the page table, or may be determined by using multiple bits of the page table, which is not specifically limited in this embodiment of the present invention.

404. Send the mapping relationship to a memory, so that the memory stores the mapping relationship.

Figure 5:
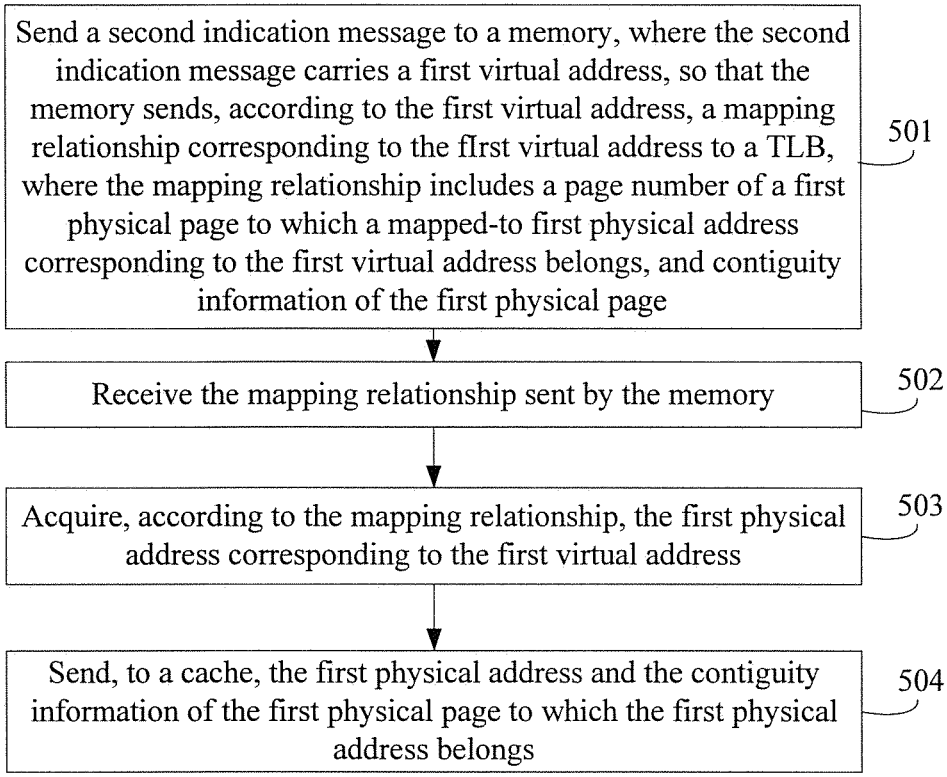
FIG. 5 is still another schematic diagram of a cross-page prefetching method according to an embodiment of the present invention.

This embodiment of the present invention further provides a cross-page prefetching method. As specifically shown in FIG. 5, the method includes:

501. Send a second indication message to a memory, where the second indication message carries a first virtual address, so that the memory sends, according to the first virtual address, a mapping relationship corresponding to the first virtual address to a translation lookaside buffer TLB, where the mapping relationship includes a page number of a first physical page and contiguity information of the first physical page, where the first physical page is a page to which a mapped-to first physical address corresponding to the first virtual address belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address.

Specifically, the mapping relationship is generally stored in memory, however, in order to improve a speed of translation between a virtual address and a physical address, several frequently used mapping relationships or mapping relationships to be used in the near future may be stored in the translation lookaside buffer TLB.

When a memory is accessed, the TLB first receives an indication message that the processor accesses the memory, where the indication message carries the first virtual address, then the TLB performs translation between the virtual address and the physical address according to the stored mapping relationship. However, after the TLB receives the indication message that the processor accesses the memory, if the mapping relationship corresponding to the first virtual address does not exist in the TLB, the TLB sends a second indication message that the mapping relationship is missing to the memory, and applies to the memory for the mapping relationship corresponding to the first virtual address. The memory searches for the stored mapping relationship according to the first virtual address and sends the mapping relationship corresponding to the first virtual address to the TLB.

Specifically, if the foregoing mapping relationship between the virtual memory space and the physical memory space may be represented by using a mapping relationship page table, the mapping relationship between the first virtual address and the first physical address herein may be represented by using a page table entry in the page table.

502. Receive the mapping relationship sent by the memory.

503. Acquire, according to the mapping relationship, the first physical address corresponding to the first virtual address.

504. Send, to a cache, the first physical address and the contiguity information of the first physical page to which the first physical address belongs.

Specifically, the TLB sends, to the cache, the contiguity information of the first physical page to which the first physical address belongs. When a physical address is missing in the cache, the contiguity information may enter the prefetching device along with data flows, so that after training of a prefetching mechanism is completed and the prefetching device determines that the prefetching address crosses pages, when it is determined, according to the contiguity information, that a physical page to which a current fetch address belongs is contiguous, the prefetching device executes cross-page prefetching, which solves a problem in the prior art of a low hit ratio of the prefetching device because prefetching is stopped after cross-page prefetching is determined, improves a prefetching hit ratio of the prefetching device and further improves efficiency of memory access.

Figure 6:
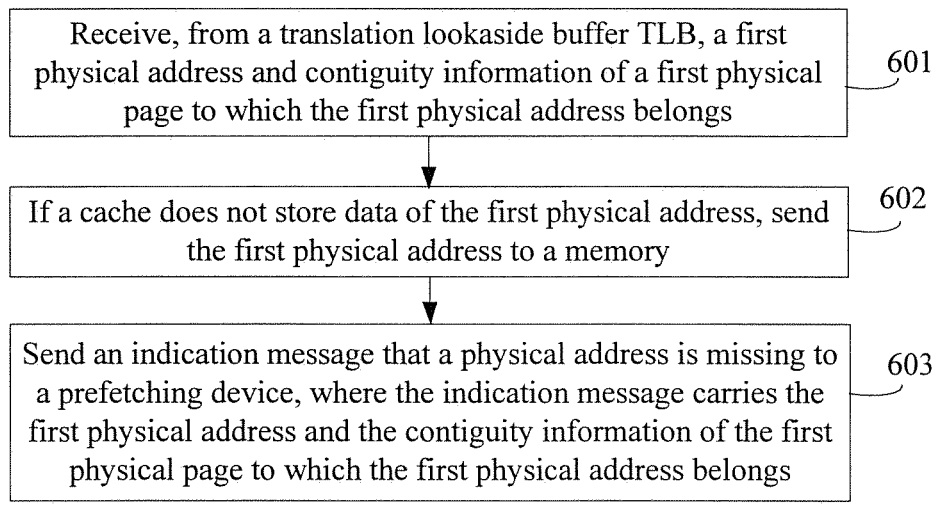
FIG. 6 is still another schematic diagram of a cross-page prefetching method according to an embodiment of the present invention.

This embodiment of the present invention further provides a cross-page prefetching method. As specifically shown in FIG. 6, the method includes:

601. Receive a first physical address and contiguity information of a first physical page to which the first physical address belongs that are sent by a translation lookaside buffer TLB, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address.

602. If a cache does not store data of the first physical address, send the first physical address to a memory, so that a processor acquires, from memory of the memory, the data of the first physical address.

603. Send an indication message that a physical address is missing to a prefetching device, where the indication message carries the first physical address and the contiguity information of the first physical page to which the first physical address belongs.

It should be noted that, generally, when the processor does not hit an instruction or data from the cache, in order to improve a speed of reading the instruction or data, the cache generally acquires, from a memory according to a storage address of the instruction or data accessed by the processor, a corresponding instruction or data, and sends an indication message that a physical address is missing to a prefetching device, instructs the prefetching device to prefetch, from the memory, a next instruction or next data to be accessed by the processor, and stores the next instruction or the next data to be accessed by the processor into the cache.

It should be noted that, the step 602 of the sending the first physical address to a memory and the step 603 of the sending an indication message that a physical address is missing to a prefetching device do not have a fixed sequence, both the step 602 and the step 603 are actions executed after it is determined that the data of the first physical address has not been stored, and the sequence of the step 602 and the step 603 is not specifically limited in this embodiment of the present invention.

This embodiment of the present invention provides a cross-page prefetching method. The method includes: receiving, by a processor, a first indication message of applying for memory space; allocating, by the processor, physical memory space and virtual memory space according to capacity information of the memory space carried in the first indication message; establishing, by the processor, a mapping relationship between the virtual memory space and the physical memory space, where the mapping relationship includes a page number of a first physical page and contiguity information of the first physical page, where the first physical page is a page to which a mapped-to first physical address corresponding to a first virtual address included in the virtual memory space belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address; and finally, sending, by the processor, the mapping relationship to a memory. When a translation lookaside buffer TLB sends, to the memory, a second indication message that a mapping relationship corresponding to the first virtual address is missing, the memory may send the mapping relationship that includes the contiguity information of the first physical page and is corresponding to the first virtual address to the TLB, so that the TLB receives the mapping relationship that includes the contiguity information of the first physical page, and after the translation between the first virtual address and the first physical address is completed, the TLB sends, to a cache, the first physical address and the contiguity information of the first physical page to which the first physical address belongs. When a physical address is missing in the cache, the contiguity information may enter a prefetching device along with data flows, so that after training of a prefetching mechanism is completed and the prefetching device acquires a prefetching address, if a page number of a physical page to which the prefetching address belongs is different from a page number of the first physical page, and it is determined, according to the contiguity information of the first physical page, that the first physical page is contiguous, the prefetching device prefetches the data at the prefetching address, which solves a problem in the prior art of a low hit ratio of the prefetching device because prefetching is stopped after cross-page prefetching is determined, improves a prefetching hit ratio of the prefetching device and further improves efficiency of memory access.

Embodiment 2

Figure 7:
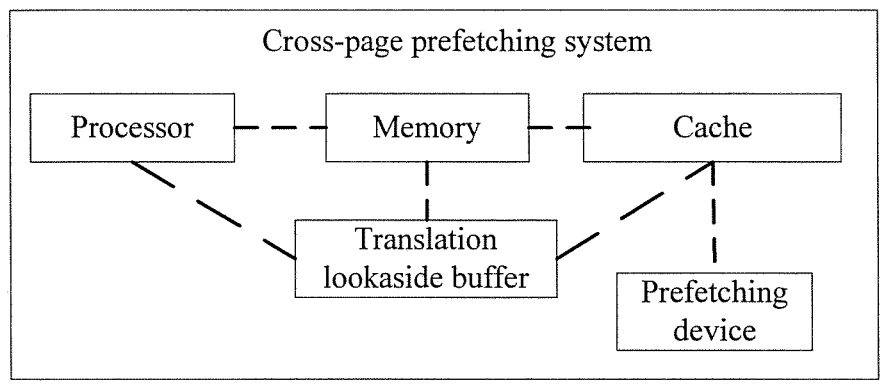
FIG. 7 is a schematic diagram of a cross-page prefetching system according to an embodiment of the present invention.

An embodiment of the present invention provides a cross-page prefetching method, specific description is performed by using a cross-page prefetching system shown in FIG. 7, and the cross-page prefetching system includes a processor, a memory, a cache, a translation lookaside buffer, and a prefetching device.

Figure 8:
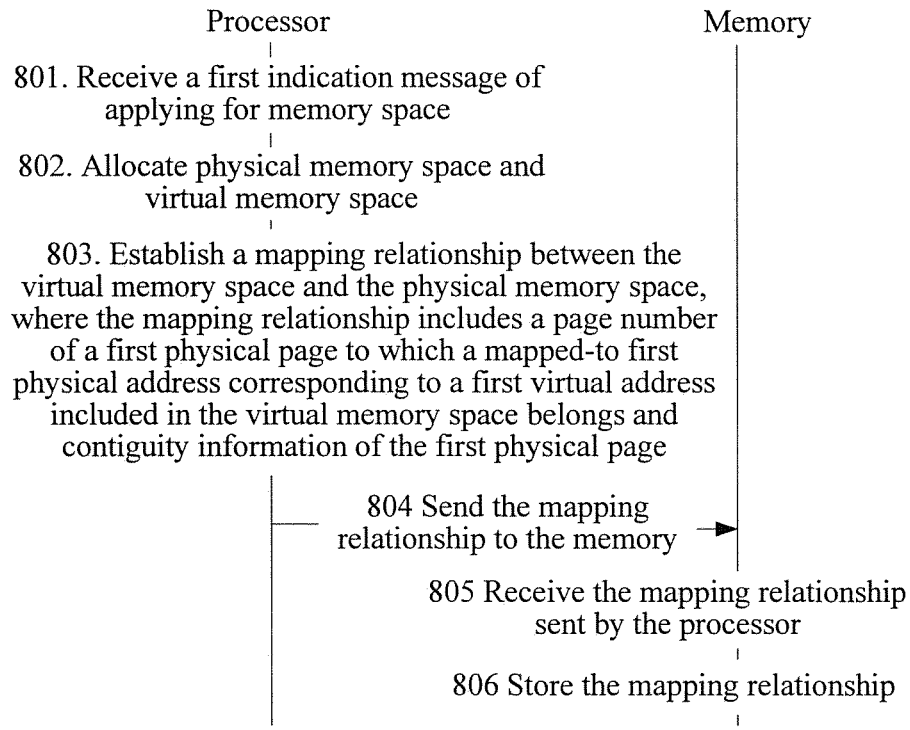
FIG. 8 is an interworking diagram of a processor and a memory that are in a cross-page prefetching system according to an embodiment of the present invention.

In order to implement cross-page prefetching, first, when an application program is loaded, the processor allocates, in a memory and for the application program, memory space for an instruction and data of the program, as specifically shown in FIG. 8, including:

801. The processor receives a first indication message of applying for memory space, where the first indication message carries capacity information of the memory space.

802. The processor allocates physical memory space and virtual memory space according to the capacity information of the memory space.

Specifically, when the application program is loaded, the processor first receives the first indication message that the application program applies for the memory space, where the first indication message carries the capacity information of the memory space. Then the processor allocates corresponding physical memory space and virtual memory space according to the capacity information of the memory space. When the physical memory space and the virtual memory space are being allocated, if the first indication message carries information about a virtual address, a corresponding size of virtual memory space is opened up according to the virtual address; otherwise, the processor randomly allocates appropriate virtual memory space, and correspondingly, the processor randomly allocates appropriate physical memory space.

It should be noted that, a problem of allocating memory space belongs to a problem in the prior art, which is not specifically limited in this embodiment of the present invention, and only an exemplary implementation solution is provided.

803. The processor establishes a mapping relationship between the virtual memory space and the physical memory space, where the mapping relationship includes a page number of a first physical page and contiguity information of the first physical page, where the first physical page is a page to which a mapped-to first physical address corresponding to a first virtual address included in the virtual memory space belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address.

Specifically, the mapping relationship, established in the prior art, between the virtual memory space and the physical memory space includes only page number information of the first physical page to which the mapped-to first physical address corresponding to the first virtual address included in the virtual memory space belongs; in this embodiment of the present invention, the mapping relationship established by the processor further stores the contiguity information of the first physical page, where the contiguity information of the first physical page is used to indicate whether the physical page mapped to the first virtual page is contiguous with the physical page mapped to the next contiguous virtual page of the first virtual page, the first virtual page includes the first virtual address mapped to the first physical address, and the contiguity information and the page number of the first physical page coexist in the mapping relationship.

Specifically, the mapping relationship between the virtual memory space and the physical memory space may be represented by using a mapping relationship page table. The contiguity information of the first physical page may be determined by using one bit of the page table, or may be determined by using multiple bits of the page table, which is not specifically limited in this embodiment of the present invention.

804. The processor sends the mapping relationship to the memory.

805. The memory receives the mapping relationship sent by the processor.

806. The memory stores the mapping relationship.

Figure 9A:
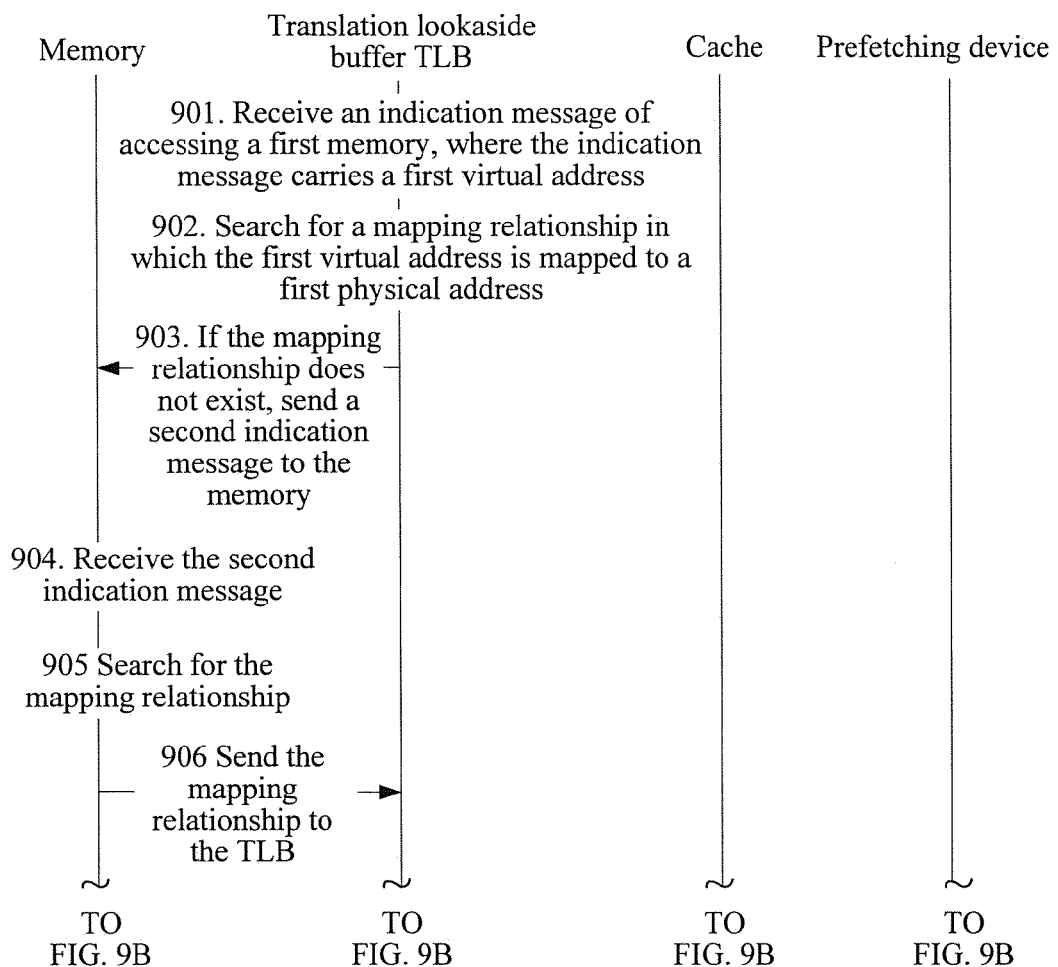
FIG. 9A and FIG. 9B are an interworking diagram of a memory, a translation lookaside buffer, a cache, and a prefetching device that are in a cross-page prefetching system according to an embodiment of the present invention.
Figure 9B:
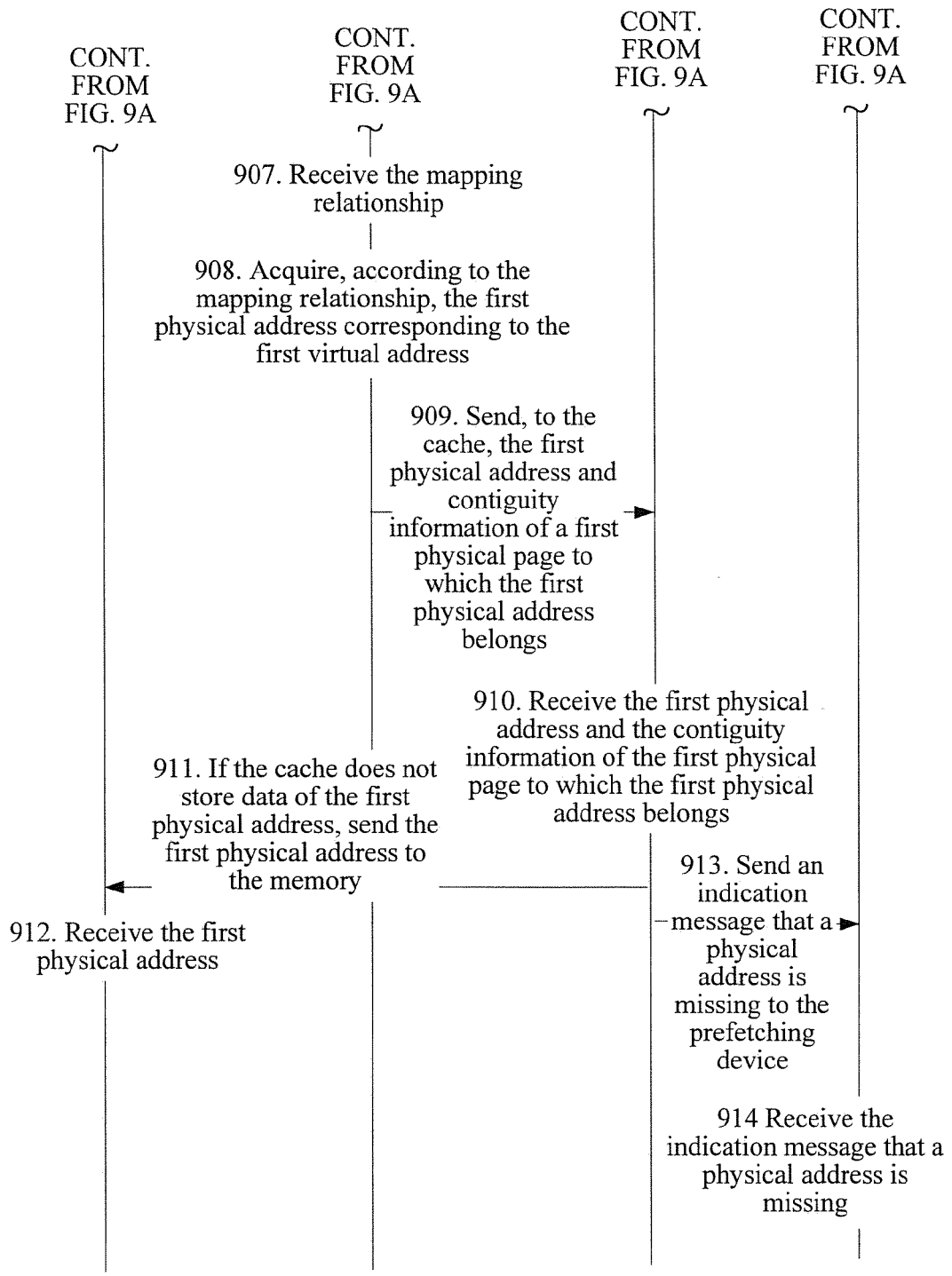

Certainly, after loading of the program is completed, and the processor allocates, in the memory and for the application program, the memory space for the instruction and the data of the program, in order to improve a speed of translation between a virtual address and a physical address, the processor stores several frequently used mapping relationships or mapping relationships to be used in the near future into the translation lookaside buffer TLB. When a memory is accessed, the TLB first receives an indication message that the processor accesses the memory. The following continues giving the specific description by using an example in which, after the TLB receives the indication message that the processor accesses a first memory, the TLB exchanges with the memory and the cache, and the cache exchanges with the prefetching device, as specifically shown in FIG. 9A and FIG. 9B, including:

901. The TLB receives an indication message of accessing a first memory, where the indication message carries the first virtual address.

It should be noted that, the "first" in the first memory does not have any special meaning, and the "first" only represents a memory pointed by the first physical address corresponding to the first virtual address.

902. The TLB searches for, according to the first virtual address, the mapping relationship in which the first virtual address is mapped to the first physical address.

903. If the mapping relationship does not exist, send a second indication message to the memory, where the second indication message carries the first virtual address, so that the memory sends, according to the first virtual address, the mapping relationship corresponding to the first virtual address to the translation lookaside buffer TLB, where the mapping relationship includes the page number of the first physical page to which the mapped-to first physical address corresponding to the first virtual address belongs, and the contiguity information of the first physical page, where the contiguity information of the first physical page is used to indicate whether the physical page mapped to the first virtual page is contiguous with the physical page mapped to the next contiguous virtual page of the first virtual page, and the first virtual page includes the first virtual address mapped to the first physical address.

904. The memory receives the second indication message.

905. The memory searches for the mapping relationship according to the first virtual address.

906. The memory sends the mapping relationship to the TLB.

907. The TLB receives the mapping relationship sent by the memory.

Certainly, after the TLB receives the mapping relationship sent by the memory, the mapping relationship between the first virtual address and the first physical address is existed in the TLB.

908. The TLB acquires, according to the mapping relationship, the first physical address corresponding to the first virtual address.

909. The TLB sends, to the cache, the first physical address and the contiguity information of the first physical page to which the first physical address belongs.

910. The cache receives the first physical address and the contiguity information of the first physical page to which the first physical address belongs.

911. If the cache does not store data of the first physical address, send the first physical address to the memory, so that the processor acquires, from memory of the memory, the data of the first physical address.

912. The memory receives the first physical address sent by the cache.

913. The TLB sends an indication message that a physical address is missing to a prefetching device, where the indication message carries the first physical address and the contiguity information of the first physical page to which the first physical address belongs.

Specifically, when a physical address is missing in the cache, the contiguity information may enter the prefetching device along with data flows, so that after training of a prefetching mechanism is completed and the prefetching device acquires a prefetching address, if a page number of a physical page to which the prefetching address belongs is different from a page number of the first physical page, and it is determined, according to the contiguity information of the first physical page, that the first physical page is contiguous, the prefetching device prefetches the data at the prefetching address, which solves a problem in the prior art of a low hit ratio of the prefetching device because prefetching is stopped after cross-page prefetching is determined, improves a prefetching hit ratio of the prefetching device and further improves efficiency of memory access.

It should be noted that, the step 911 of the sending the first physical address to the memory and the step 913 of the sending an indication message that a physical address is missing to a prefetching device do not have a fixed sequence, both the step 911 and the step 913 are actions executed after it is determined that the data of the physical address has not been stored, and the sequence of the step 911 and the step 913 is not specifically limited in this embodiment of the present invention.

914. The prefetching device receives the indication message, sent by the cache, that a physical address is missing.

Figure 10:
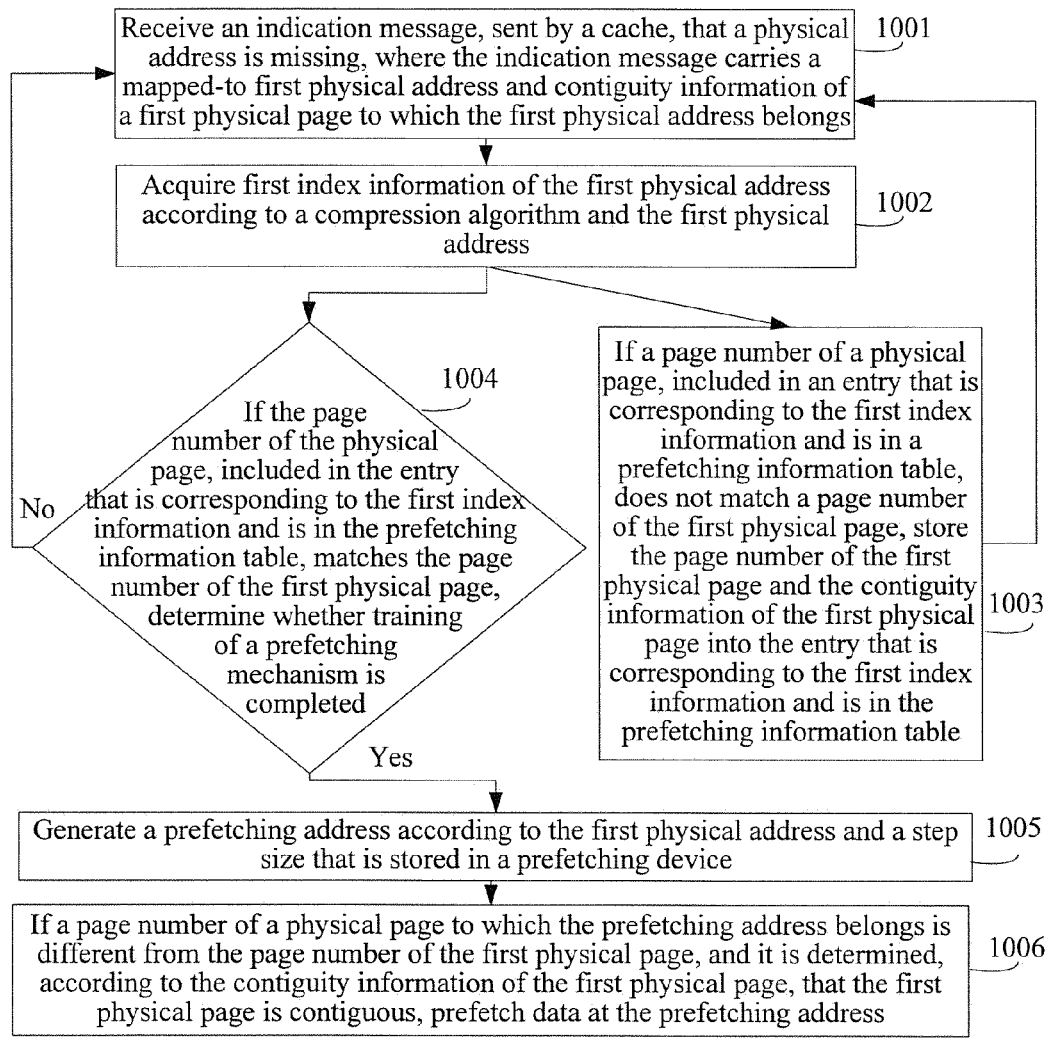
FIG. 10 is a working flowchart of a prefetching device in a cross-page prefetching system according to an embodiment of the present invention.

Specifically, after the prefetching device receives the indication message, sent by the cache, that a physical address is missing, a cross-page prefetching method on the prefetching-device side is specifically shown in FIG. 10, including:

1001. The prefetching device receives the indication message, sent by the cache, that a physical address is missing, where the indication message carries the mapped-to first physical address and the contiguity information of the first physical page to which the first physical address belongs, where the contiguity information of the first physical page is used to indicate whether the physical page mapped to the first virtual page is contiguous with the physical page mapped to the next contiguous virtual page of the first virtual page, and the first virtual page includes the first virtual address mapped to the first physical address.

1002. Acquire first index information of the first physical address according to a compression algorithm and the first physical address.

1003. If a page number of a physical page, included in an entry that is corresponding to the first index information and is in a prefetching information table, does not match a page number of the first physical page, store the page number of the first physical page and the contiguity information of the first physical page into the entry that is corresponding to the first index information and is in the prefetching information table.

1004. If the page number of the physical page, included in the entry that is corresponding to the first index information and is in the prefetching information table, matches the page number of the first physical page, determine whether training of a prefetching mechanism of the prefetching device is completed.

1005. If the training of the prefetching mechanism is completed, acquire a prefetching address according to the first physical address and a step size that is stored in the prefetching device.

1006. If a page number of a physical page to which the prefetching address belongs is different from the page number of the first physical page, and it is determined, according to the contiguity information of the first physical page, that the first physical page is contiguous, prefetch data at the prefetching address.

Specifically, for the cross-page prefetching method performed by using the prefetching device, reference may be made to the description in Embodiment 1, and details are not described again in this embodiment of the present invention.

Figure 11:
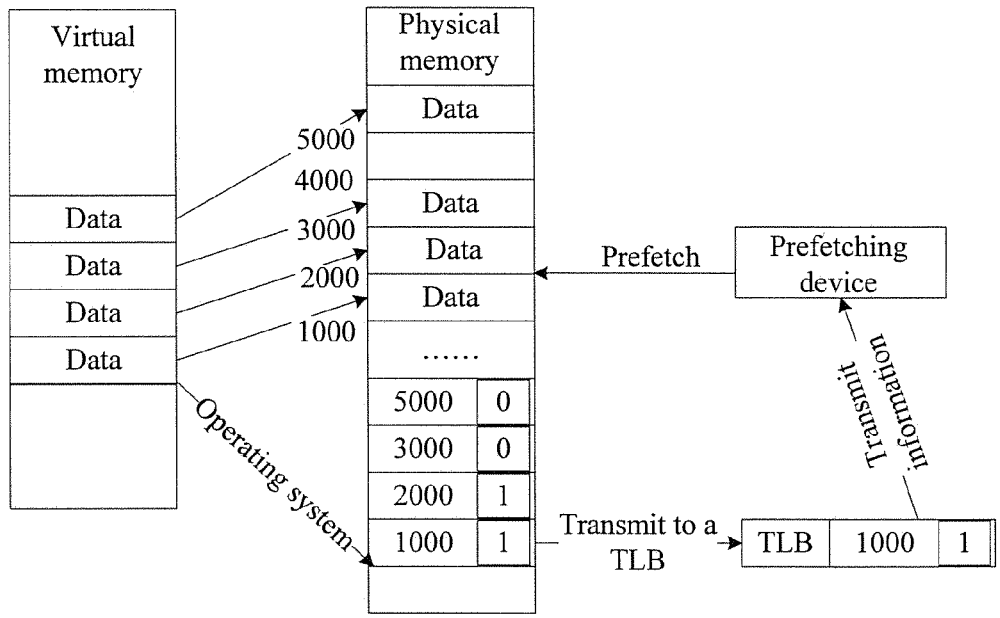
FIG. 11 is a schematic flowchart of an example of cross-page prefetching.

In conclusion, in Embodiment 2, a cross-page prefetching method is described in detail under the cross-page prefetching system shown in FIG. 7, the following gives an exemplary operation to describe the whole procedure of the cross-page prefetching, as specifically shown in FIG. 11:

In FIG. 11, four adjacent virtual pages in a virtual memory are separately mapped to physical page 1, physical page 2, physical page 3, and physical page 5 in a physical memory, where contiguity information of a physical page is represented by "1" and "0", "1" indicates that the physical page is contiguous, and "0" indicates that the physical page is noncontiguous. It can be obviously seen from FIG. 11 that physical pages whose page numbers are 1 and 2 are contiguous, and physical page whose page numbers are 3 and 5 are noncontiguous.

First, an operating system stores the contiguity information of the physical page into the physical memory; then a TLB stores the contiguity information of the physical page into a TLB entry; finally, a prefetching device stores the contiguity information of the physical page into the prefetching device, and determines, according to the contiguity information of the physical page, whether to perform cross-page prefetching.

This embodiment of the present invention provides a cross-page prefetching method. The method includes: receiving, by a processor, a first indication message of applying for memory space; allocating, by the processor, physical memory space and virtual memory space according to capacity information of the memory space carried in the first indication message; establishing, by the processor, a mapping relationship between the virtual memory space and the physical memory space, where the mapping relationship includes a page number of a first physical page and contiguity information of the first physical page, where the first physical page is a page to which a mapped-to first physical address corresponding to a first virtual address included in the virtual memory space belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address; and finally, sending, by the processor, the mapping relationship to a memory. When a translation lookaside buffer TLB sends, to the memory, a second indication message that a mapping relationship corresponding to the first virtual address is missing, the memory may send the mapping relationship that includes the contiguity information of the first physical page and is corresponding to the first virtual address to the TLB, so that the TLB receives the mapping relationship that includes the contiguity information of the first physical page, and after the translation between the first virtual address and the first physical address is completed, the TLB sends, to a cache, the first physical address and the contiguity information of the first physical page to which the first physical address belongs. When a physical address is missing in the cache, the contiguity information may enter a prefetching device along with data flows, so that after training of a prefetching mechanism is completed and the prefetching device acquires a prefetching address, if a page number of a physical page to which the prefetching address belongs is different from a page number of the first physical page, and it is determined, according to the contiguity information of the first physical page, that the first physical page is contiguous, the prefetching device prefetches the data at the prefetching address, which solves a problem in the prior art of a low hit ratio of the prefetching device because prefetching is stopped after cross-page prefetching is determined, improves a prefetching hit ratio of the prefetching device and further improves efficiency of memory access.

Embodiment 3

Figure 12:
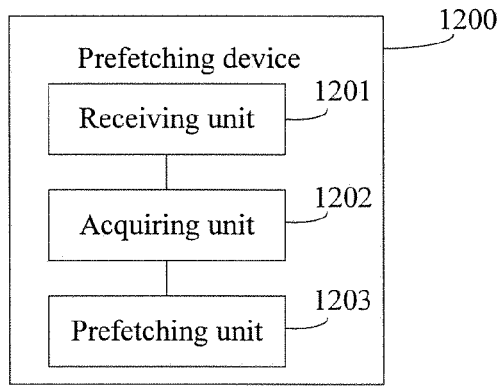
FIG. 12 is a schematic diagram of a prefetching device according to an embodiment of the present invention.

An embodiment of the present invention provides a prefetching device 1200, as specifically shown in FIG. 12, and the prefetching device 1200 includes a receiving unit 1201, an acquiring unit 1202, and a prefetching unit 1203.

The receiving unit 1201 is configured to receive an indication message, sent by a cache, that a physical address is missing, where the indication message carries a mapped-to first physical address and contiguity information of a first physical page to which the first physical address belongs, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address.

The acquiring unit 1202 is configured to acquire a prefetching address according to the first physical address and a step size that is stored in the prefetching device.

The prefetching unit 1203 is configured to: if a page number of a physical page to which the prefetching address belongs is different from a page number of the first physical page, and it is determined, according to the contiguity information of the first physical page, that the first physical page is contiguous, prefetch data at the prefetching address.

Figure 13:
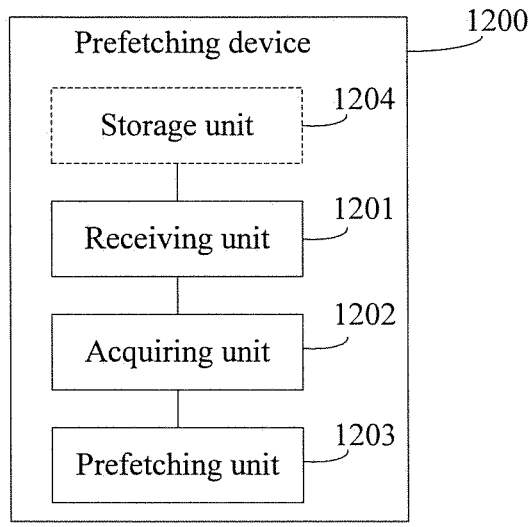
FIG. 13 is another schematic diagram of a prefetching device according to an embodiment of the present invention.

Further, as shown in FIG. 13, the prefetching device further includes a storage unit 1204.

The storage unit 1204 is configured to: after the receiving unit 1201 receives the indication message, sent by the cache, that a physical address is missing, store, into an entry that is corresponding to the first physical address and is in a prefetching information table, the contiguity information that is of the first physical page to which the first physical address belongs and is carried in the indication message, where the prefetching information table is stored in the prefetching device.

Figure 14:
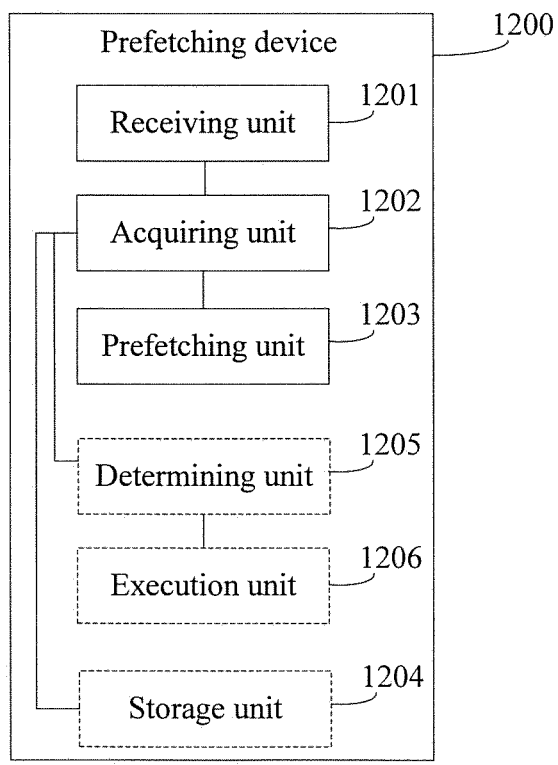
FIG. 14 is still another schematic diagram of a prefetching device according to an embodiment of the present invention.

Optionally, as shown in FIG. 14, the prefetching device further includes a determining unit 1205, an execution unit 1206, and a storage unit 1204.

The acquiring unit 1202 is configured to: before the acquiring a prefetching address according to the first physical address and a step size that is stored in a prefetching device, acquire first index information of the first physical address according to a compression algorithm and the first physical address.

The determining unit 1205 is configured to: if a page number of a physical page, included in an entry that is corresponding to the first index information and is in a prefetching information table, matches the page number of the first physical page, determine whether training of a prefetching mechanism of the prefetching device is completed, where the prefetching information table is stored in the prefetching device.

The execution unit 1206 is configured to: if the training of the prefetching mechanism is completed, execute the step of acquiring a prefetching address.

The storage unit 1204 is configured to: if the page number of the physical page, included in the entry that is corresponding to the first index information and is in the prefetching information table, does not match the page number of the first physical page, store the page number of the first physical page and the contiguity information of the first physical page into the entry that is corresponding to the first index information and is in the prefetching information table.

Further, the first index information of the first physical address specifically includes at least one piece of the following information:

the page number of the first physical page to which the first physical address belongs;

a compression value of the page number of the first physical page to which the first physical address belongs; and a hash value of the page number of the first physical page to which the first physical address belongs.

Specifically, when cross-page prefetching is performed, for a working process of the prefetching device, reference may be made to the description of Embodiment 1 and Embodiment 2, which is not repeatedly described in this embodiment of the present invention.

This embodiment of the present invention provides a prefetching device, and the prefetching device includes a receiving unit, an acquiring unit, and a prefetching unit. The receiving unit is configured to receive an indication message, sent by a cache, that a physical address is missing, where the indication message carries a mapped-to first physical address and contiguity information of a first physical page to which the first physical address belongs, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address; the acquiring unit is configured to acquire a prefetching address according to the first physical address and a step size that is stored in the prefetching device; and the prefetching unit is configured to: if a page number of a physical page to which the prefetching address belongs is different from a page number of the first physical page, and it is determined, according to the contiguity information of the first physical page, that the first physical page is contiguous, prefetch data at the prefetching address.

Because when a prefetching address crosses pages, and after it is determined, according to contiguity information of the first physical page, that the first physical page is contiguous, the prefetching device prefetches data at the prefetching address, which solves a problem in the prior art of a low hit ratio of the prefetching device because prefetching is stopped after cross-page prefetching is determined, improves a prefetching hit ratio of the prefetching device and further improves efficiency of memory access.

Embodiment 4

Figure 15:
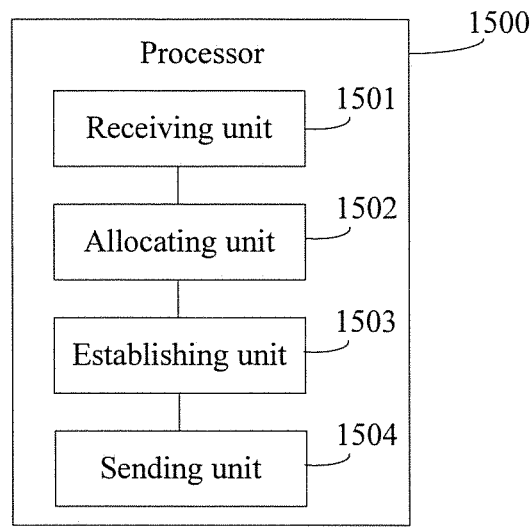
FIG. 15 is a schematic diagram of a processor according to an embodiment of the present invention.

An embodiment of the present invention provides a processor 1500, as specifically shown in FIG. 15, and the processor 1500 includes a receiving unit 1501, an allocating unit 1502, an establishing unit 1503, and a sending unit 1504.

The receiving unit 1501 is configured to receive a first indication message of applying for memory space, where the first indication message carries capacity information of the memory space.

The allocating unit 1502 is configured to allocate physical memory space and virtual memory space according to the capacity information of the memory space.

The establishing unit 1503 is configured to establish a mapping relationship between the virtual memory space and the physical memory space, where the mapping relationship includes a page number of a first physical page and contiguity information of the first physical page, where the first physical page is a page to which a mapped-to first physical address corresponding to a first virtual address included in the virtual memory space belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address.

The sending unit 1504 is configured to send the mapping relationship to a memory, so that the memory stores the mapping relationship.

Specifically, when cross-page prefetching is performed, for a working process of the processor, reference may be made to the description of Embodiment 1 and Embodiment 2, which is not repeatedly described in this embodiment of the present invention.

Based on the processor provided in this embodiment of the present invention, because a mapping relationship established by the processor includes contiguity information of a mapped first physical page, after the processor sends the mapping relationship to a memory, the mapping relationship in the memory also includes the contiguity information of the first physical page, and the mapping relationship acquired from the memory by a translation lookaside buffer TLB also includes the contiguity information of the first physical page; when a physical address is missing in a cache, the contiguity information may enter a prefetching device along with data flows, so that after training of a prefetching mechanism is completed, the prefetching device acquires a prefetching address, and determines that the prefetching address crosses pages, and after it is determined, according to the contiguity information of the first physical page, that a first physical page to which a current fetch address belongs is contiguous, the prefetching device prefetches data at the prefetching address, which solves a problem in the prior art of a low hit ratio of the prefetching device because prefetching is stopped after cross-page prefetching is determined, improves a prefetching hit ratio of the prefetching device and further improves efficiency of memory access.

Embodiment 5

Figure 16:
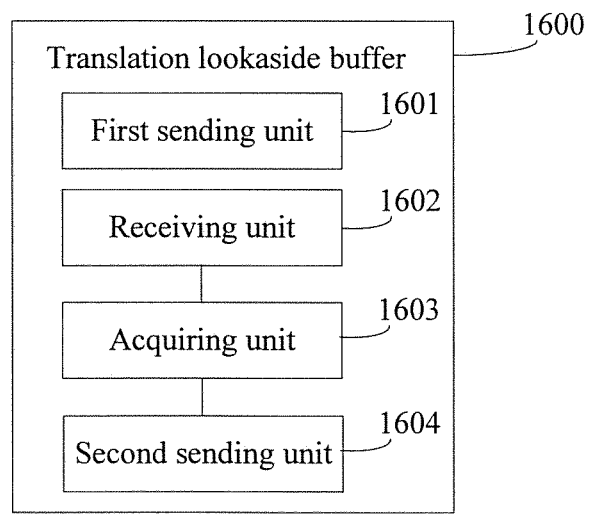
FIG. 16 is a schematic diagram of a translation lookaside buffer according to an embodiment of the present invention.

This embodiment of the present invention provides a translation lookaside buffer TLB1600, as specifically shown in FIG. 16, and the TLB1600 includes a first sending unit 1601, a receiving unit 1602, an acquiring unit 1603, and a second sending unit 1604.

The first sending unit 1601 is configured to send a second indication message to a memory, where the second indication message carries a first virtual address, so that the memory sends, according to the first virtual address, a mapping relationship corresponding to the first virtual address to the translation lookaside buffer TLB, where the mapping relationship includes a page number of a first physical page and contiguity information of the first physical page, where the first physical page is a page to which a mapped-to first physical address corresponding to the first virtual address belongs, the contiguity information of the first physical page is used to indicate whether a physical page mapped to a first virtual page is contiguous with a physical page mapped to a next contiguous virtual page of the first virtual page, and the first virtual page includes the first virtual address mapped to the first physical address.

The receiving unit 1602 is configured to receive the mapping relationship sent by the memory.

The acquiring unit 1603 is configured to acquire, according to the mapping relationship, the first physical address corresponding to the first virtual address.

The second sending unit 1604 is configured to send, to a cache, the first physical address and the contiguity information of the first physical page to which the first physical address belongs.

Specifically, when cross-page prefetching is performed, for a working process of the translation lookaside buffer, reference may be made to the description of Embodiment 1 and Embodiment 2, which is not repeatedly described in this embodiment of the present invention.

In the translation lookaside buffer TLB provided in this embodiment of the present invention, when a mapping relationship is missing, because a mapping relationship acquired from a memory includes contiguity information of a first physical page, after the TLB completes, according to the mapping relationship, translation between a virtual address and a physical address, sends a first physical address and the contiguity information of the first physical page to which the first physical address belongs to a cache. When a physical address is missing in the cache, the contiguity information may enter a prefetching device along with data flows, so that after training of a prefetching mechanism is completed, the prefetching device acquires a prefetching address and determines that the prefetching address crosses pages, and it is determined that, according to the contiguity information of the first physical page, that a first physical page to which a current fetch address is contiguous, the prefetching device prefetches data at the prefetching address, which solves a problem in the prior art of a low hit ratio of the prefetching device because prefetching is stopped after cross-page prefetching is determined, improves a prefetching hit ratio of the prefetching device and further improves efficiency of memory access.

Embodiment 6

Figure 17:
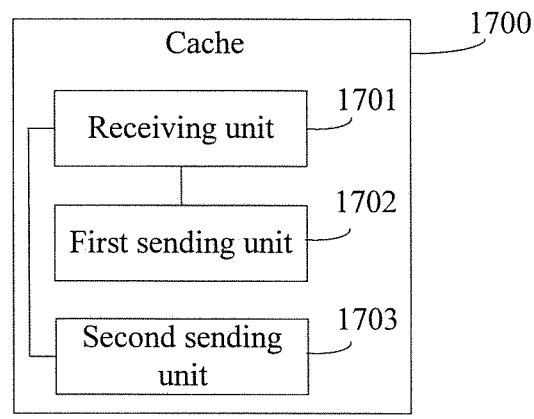
FIG. 17 is a schematic diagram of a cache according to an embodiment of the present invention.

An embodiment of the present invention provides a cache 1700, as specifically shown in FIG. 17, and the cache 1700 includes a receiving unit 1701, a first sending unit 1702, and a second sending unit 1703.

The receiving unit 1701 is configured to receive a first physical address and contiguity information of a first physical page to which the first physical address belongs that are sent by a translation lookaside buffer TLB, where the contiguity information of the first physical page is used to indicate whether a physical page mapped to a first virtual page is contiguous with a physical page mapped to a next contiguous virtual page of the first virtual page, and the first virtual page includes a first virtual address mapped to the first physical address.

The first sending unit 1702 is configured to: if the cache does not store data of the first physical address, send the first physical address to a memory, so that a processor acquires the data of the first physical address from the memory.

The second sending unit 1703 is configured to send an indication message that a physical address is missing to a prefetching device, where the indication message carries the first physical address and the contiguity information of the first physical page to which the first physical address belongs.

Specifically, when cross-page prefetching is performed, for a working process of the cache, reference may be made to the description of Embodiment 1 and Embodiment 2, which is not repeatedly described in this embodiment of the present invention.

In the cache provided in this embodiment of the present invention, when a physical address is missing, on one hand, the cache may send a first physical address to a memory, so that a processor acquires, form memory of the memory, data of the first physical address, on the other hand, the cache sends an indication message that a physical address is missing to a prefetching device, where the contiguity information may enter the prefetching device along with data flows, so that after training of a prefetching mechanism is completed, the prefetching device acquires a prefetching address and determines that the prefetching address crosses pages, and after it is determined, according to the contiguity information of the first physical page, that a first physical page to which a current fetch address belongs is contiguous, the prefetching device prefetches data at the prefetching address, which solves a problem in the prior art of a low hit ratio of the prefetching device because prefetching is stopped after cross-page prefetching is determined, improves a prefetching hit ratio of the prefetching device and further improves efficiency of memory access.

Embodiment 7

Figure 18:
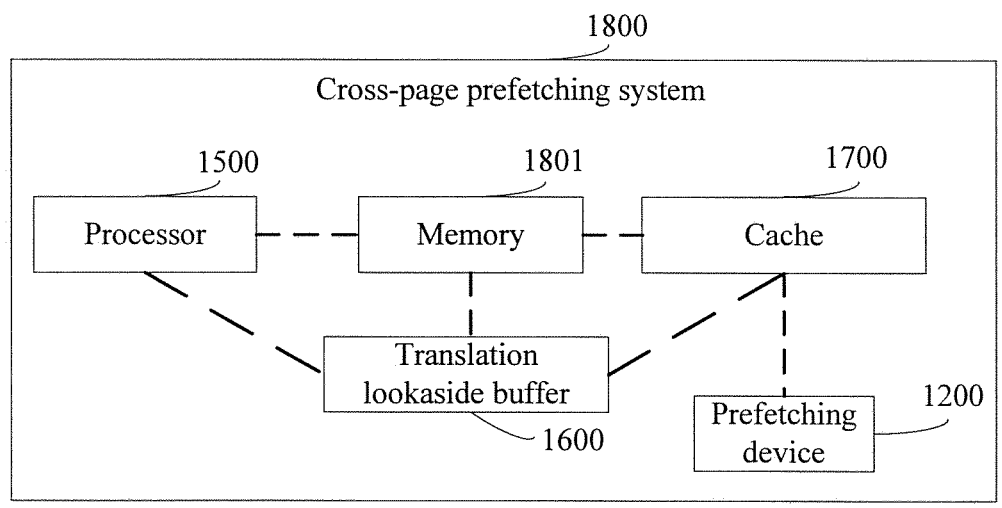
FIG. 18 is a schematic diagram of a cross-page prefetching system according to an embodiment of the present invention.

An embodiment of the present invention provides a cross-page prefetching system 1800, as specifically shown in FIG. 18, and the cross-page prefetching system includes a memory 1801, a prefetching device 1200, a processor 1500, a translation lookaside buffer TLB1600, and a cache 1700.

After the processor 1500 sends a mapping relationship that includes contiguity information of a first physical page to the memory 1801, the memory 1801 stores the mapping relationship. When a mapping relationship in which a first virtual address is mapped to a physical address cannot be found in the translation lookaside buffer TLB 1600, the mapping relationship is acquired from the memory; then the TLB 1600 sends, to the cache 1700, the first physical address and the contiguity information that is of the first physical page and is in the mapping relationship; if the cache 1700 does not store data of the first physical address, the cache 1700 sends the first physical address to the memory 1801, so that the data of the first physical address is acquired from memory of the memory 1801; in addition, the cache 1700 further sends an indication message that a physical address is missing to the prefetching device 1200, and the indication message carries the mapped-to first physical address and contiguity information of a first physical page to which the first physical address belongs. The contiguity information of the first physical page is used to indicate whether a physical page mapped to a first virtual page is contiguous with a physical page mapped to a next contiguous virtual page of the first virtual page, where the first virtual page includes the first virtual address mapped to the first physical address.

For a specific working process of the prefetching device, the processor, the translation lookaside buffer TLB, and the cache, reference may be made to the description of Embodiment 1 and Embodiment 2, which is not repeatedly described in this embodiment of the present invention.

This embodiment of the present invention provides a cross-page prefetching system, and the cross-page prefetching system includes a memory, the prefetching device according to Embodiment 3, the processor according to Embodiment 4, the translation lookaside buffer TLB according to Embodiment 5, and the cache according to Embodiment 6. Because the mapping relationship established by the processor includes contiguity information of a mapped first physical page, after the processor sends the mapping relationship to a memory, the mapping relationship in the memory also includes the contiguity information of the first physical page, and the mapping relationship acquired from the memory by a translation lookaside buffer TLB also includes the contiguity information of the first physical page; when a physical address is missing in the cache, the contiguity information of the first physical page may enter a prefetching device along with data flows, so that after training of a prefetching mechanism is completed, the prefetching device acquires a prefetching address, and determines that the prefetching address crosses pages, and after it is determined, according to the contiguity information of the first physical page, that a first physical page to which a current fetch address belongs is contiguous, the prefetching device prefetches data at the prefetching address, which solves a problem in the prior art of a low hit ratio of the prefetching device because prefetching is stopped after cross-page prefetching is determined, improves a prefetching hit ratio of the prefetching device and further improves efficiency of memory access.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A cross-page prefetching method, comprising:
receiving an indication message, sent by a cache, that a physical address is missing in the cache, wherein the indication message carries a first physical address and contiguity information of a first physical page to which the first physical address belongs, wherein the contiguity information of the first physical page is used to indicate whether the first physical page, which is mapped to a first virtual page, is contiguous with a second physical page mapped to a next contiguous virtual page of the first virtual page, and the first virtual page comprises a first virtual address mapped to the first physical address;
acquiring a prefetching address according to the first physical address and a step size that is stored in a prefetching device; and
if a page number of a third physical page to which the prefetching address belongs is different from a page number of the first physical page, and it is determined, according to the contiguity information of the first physical page, that the page number of the first physical page and the page number of the third physical page to which the prefetching address belongs are contiguous, prefetching data at the prefetching address.

2. The method according to claim 1, wherein after receiving an indication message, sent by a cache, that a physical address is missing in the cache, the method further comprises:

storing, into an entry that corresponds to the first physical address and is in a prefetching information table, the contiguity information that is of the first physical page to which the first physical address belongs and is carried in the indication message, wherein the prefetching information table is stored in the prefetching device.

3. The method according to claim 1, wherein before acquiring a prefetching address according to the first physical address and a step size that is stored in a prefetching device, the method further comprises:

acquiring first index information of the first physical address according to a compression algorithm and the first physical address;

if a page number of a fourth physical page, comprised in an entry that is corresponding to the first index information and is in a prefetching information table, matches the page number of the first physical page, determining whether training of a prefetching mechanism of the prefetching device is completed, wherein the prefetching information table is stored in the prefetching device;

if the training of the prefetching mechanism is completed, executing the step of acquiring a prefetching address; and if the page number of the fourth physical page, comprised in the entry that is corresponding to the first index information and is in the prefetching information table, does not match the page number of the first physical page, storing the page number of the first physical page and the contiguity information of the first physical page into the entry that is corresponding to the first index information and is in the prefetching information table.

4. The method according to claim 3, wherein the first index information of the first physical address comprises at least one of the following information:

the page number of the first physical page to which the first physical address belongs;

a compression value of the page number of the first physical page to which the first physical address belongs; and a hash value of the page number of the first physical page to which the first physical address belongs.

5. A prefetching device, comprising:

a receiving unit configured to receive an indication message, sent by a cache, that a physical address is missing in the cache, wherein the indication message carries a first physical address and contiguity information of a first physical page to which the first physical address belongs, wherein the contiguity information of the first physical page is used to indicate whether the first physical page, which is mapped to a first virtual page, is contiguous with a second physical page mapped to a next contiguous virtual page of the first virtual page, and the first virtual page comprises a first virtual address mapped to the first physical address;

an acquiring unit configured to acquire a prefetching address according to the first physical address and a step size that is stored in the prefetching device; and a prefetching unit configured to: if a page number of a third physical page to which the prefetching address belongs is different from a page number of the first physical page, and it is determined, according to the contiguity information of the first physical page, that the page number of the first physical page and the page number of the third physical page to which the prefetching address belongs are contiguous, prefetch data at the prefetching address.

6. The prefetching device according to claim 5, wherein the prefetching device further comprises a storage unit configured to:

after the receiving unit receives the indication message, sent by the cache, that a physical address is missing in the cache, store, into an entry that corresponds to the first physical address and is in a prefetching information table, the contiguity information that is of the first physical page to which the first physical address belongs and is carried in the indication message, wherein the prefetching information table is stored in the prefetching device.

7. The prefetching device according to claim 5, wherein:

the acquiring unit is further configured to: before the acquiring unit acquires the prefetching address according to the first physical address and the step size stored in a prefetching device, acquire first index information of the first physical address according to a compression algorithm and the first physical address; and the prefetching device further comprises:

a determining unit configured to: if a page number of a fourth physical page, comprised in an entry that is corresponding to the first index information and is in a prefetching information table, matches the page number of the first physical page, determine whether training of a prefetching mechanism of the prefetching device is completed, wherein the prefetching information table is stored in the prefetching device, an execution unit configured to: if the training of the prefetching mechanism is completed, execute the step of acquiring a prefetching address, and a storage unit is configured to: if the page number of the fourth physical page, comprised in the entry that is corresponding to the first index information and is in the prefetching information table, does not match the page number of the first physical page, store the page number of the first physical page and the contiguity information of the first physical page into the entry that is corresponding to the first index information and is in the prefetching information table.

8. The prefetching device according to claim 7, wherein the first index information of the first physical address comprises at least one of the following information:

the page number of the first physical page to which the first physical address belongs;

a compression value of the page number of the first physical page to which the first physical address belongs; and a hash value of the page number of the first physical page to which the first physical address belongs.

* * * * *